US011985358B2

United States Patent
Shang

(10) Patent No.: US 11,985,358 B2
(45) Date of Patent: May 14, 2024

(54) ARTIFACT REMOVAL METHOD AND APPARATUS BASED ON MACHINE LEARNING, AND METHOD AND APPARATUS FOR TRAINING ARTIFACT REMOVAL MODEL BASED ON MACHINE LEARNING

(71) Applicant: TENCENT TECHNOLOGY (SHENZHEN) COMPANY LIMITED, Guangdong (CN)

(72) Inventor: Yan Shang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 380 days.

(21) Appl. No.: 17/501,217

(22) Filed: Oct. 14, 2021

(65) Prior Publication Data

US 2022/0038749 A1 Feb. 3, 2022

Related U.S. Application Data

(63) Continuation of application No. PCT/CN2020/120006, filed on Oct. 9, 2020.

(30) Foreign Application Priority Data

Oct. 16, 2019 (CN) .......................... 201910984591.3

(51) Int. Cl.
H04N 19/86 (2014.01)
G06F 18/214 (2023.01)
(Continued)

(52) U.S. Cl.
CPC .......... *H04N 19/86* (2014.11); *G06F 18/214* (2023.01); *G06F 18/253* (2023.01); *G06N 20/00* (2019.01); *H04N 19/117* (2014.11)

(58) Field of Classification Search
None
See application file for complete search history.

(56) References Cited

U.S. PATENT DOCUMENTS 11,449,966 B2 * 9/2022 Su ........................... G06T 5/004
2014/0301489 A1 * 10/2014 Laroche ............... H04N 19/139
375/240.29

(Continued)

FOREIGN PATENT DOCUMENTS

CN 107463989 A 12/2017
CN 108710950 A 10/2018

(Continued)

OTHER PUBLICATIONS

Extended European Search Report dated Oct. 19, 2022 in Application No. 20876460.5.

(Continued)

*Primary Examiner* — Kaveh Abrishamkar
(74) *Attorney, Agent, or Firm* — Sughrue Mion, PLLC

(57) ABSTRACT

Provided are an artifact removal method and apparatus based on machine learning (ML), and a method and apparatus for training an artifact removal model based on ML, in the field of artificial intelligence (AI). In the method, artifacts that may be generated in a process of compressing a video is preprocessed and removed by using an artifact removal model having a residual learning capability.

16 Claims, 8 Drawing Sheets

(51) Int. Cl.
  *G06F 18/25* (2023.01)
  *G06N 20/00* (2019.01)
  *H04N 19/117* (2014.01)

(56) References Cited

U.S. PATENT DOCUMENTS

| | | | |
|---|---|---|---|
| 2014/0321540 A1* | 10/2014 | Leontaris | H04N 19/45 375/240.03 |
| 2018/0197278 A1 | 7/2018 | Lee et al. | |
| 2020/0349682 A1* | 11/2020 | Mayol Cuevas | G06V 10/776 |
| 2021/0281867 A1* | 9/2021 | Golinski | G06N 3/045 |

FOREIGN PATENT DOCUMENTS

| | | |
|---|---|---|
| CN | 109166161 A | 1/2019 |
| CN | 109257600 A | 1/2019 |
| CN | 109785249 A | 5/2019 |
| CN | 110276736 A | 9/2019 |
| CN | 110677649 A | 1/2020 |

OTHER PUBLICATIONS

Yuanying Dai et al., "A Convolutional Neural Network Approach for Post-Processing in HEVC Intra Coding", SAT 2015 18th International Conference, Austin, TX, Dec. 31, 2016, pp. 28-39 (12 pages total).
Chinese Office Action for 201910984591.3 dated Mar. 11, 2021.
Written Opinion of the International Searching Authority for PCT/CN2020/120006 dated Dec. 30, 2020 (PCT/ISA/237).
International Search Report for PCT/CN2020/120006 dated Dec. 30, 2020 (PCT/ISA/210).
Tao Chen et al., "Adaptive Postfiltering of Transform Coefficients for the Reduction of Blocking Artifacts", IEEE Transactions on Circuits and Systems for Video Technology, May 5, 2001, pp. 594-602, vol. 11, No. 5.
Nie Kehui et al., "Video compression artifact removal algorithm based on adaptive separable convolution network", Journal of Computer Applications, May 10, 2019, pp. 1473-1479, vol. 39, No. 5.

* cited by examiner

ARTIFACT REMOVAL METHOD AND APPARATUS BASED ON MACHINE LEARNING, AND METHOD AND APPARATUS FOR TRAINING ARTIFACT REMOVAL MODEL BASED ON MACHINE LEARNING

CROSS-REFERENCE TO RELATED APPLICATION(S)

This application is a continuation application of International Application No. PCT/CN2020/120006, filed Oct. 9, 2020, which claims priority to Chinese Patent Application No. 201910984591.3, filed on Oct. 16, 2019 with the China National Intellectual Property Administration, the disclosures of which are incorporated by reference in their entireties.

FIELD

The disclosure relates to the field of artificial intelligence (AI), and in particular, to an artifact removal method and apparatus based on machine learning (ML), and a method and apparatus for training an artifact removal model based on ML.

BACKGROUND

Internet video data is increased dramatically. To reduce costs of storage and transmission of videos, a relatively high compression rate is adopted for performing encoding and compression on the videos.

In a process of encoding and compressing the videos, due to an information loss caused by operations of removing high-frequency information such as quantization and block division, negative effects of artifacts such as a blocking artifact, a ringing artifact, and an edge burr appear. The artifacts seriously degrade the video quality and affect users' viewing experience. Therefore, it is necessary to add a step of removing the artifacts in the process of encoding and compressing the videos. A conventional video artifact removal is implemented through operations of performing a brightness adjustment, a saturation adjustment, sharpening, denoising, and the like on an image by using a video enhancement filter.

However, the video enhancement filter performs a main function of removing random noise in a flat pixel area, and has a limited effect of removing video artifacts.

SUMMARY

Embodiments of the disclosure provide an artifact removal method and apparatus based on machine learning (ML), and a method and apparatus for training an artifact removal model based on ML, to preprocess, by using an artifact removal model, artifacts that may appear in a process of encoding and compressing a video, thereby preventing a plurality of types of artifacts from noticeably appearing in the encoded and compressed video.

According to an aspect of an example embodiment of the disclosure, an artifact removal method based on ML is provided, applicable to an electronic device, the method including:

invoking an artifact removal model to predict a residual between an $i^{th}$ original image frame of a video and an image frame obtained after the $i^{th}$ original image frame is compressed, to obtain a predicted residual of the $i^{th}$ original image frame, the video comprising at least two original image frames and i being a positive integer;

invoking the artifact removal model to add the predicted residual and the $i^{th}$ original image frame, to obtain a target image frame after artifact removal processing; and sequentially performing encoding and compression on at least two target image frames corresponding to the at least two original image frames, to obtain a video frame sequence after artifact removal.

According to another aspect of an example embodiment of the disclosure, a method for training an artifact removal model based on ML is provided, applicable to an electronic device, the method including:

obtaining a training sample, each group of training samples including an original image frame sample of a video sample and an image frame sample obtained after the original image frame sample is encoded and compressed;

invoking the artifact removal model to predict a residual between the original image frame sample and the image frame sample after the encoding and compression in the each group of training samples, to obtain a sample residual;

invoking the artifact removal model to add the sample residual and the image frame sample after the encoding and compression, to obtain a target image frame sample after artifact removal processing; and determining a loss between the target image frame sample and the original image frame sample, and adjusting model parameters in the artifact removal model according to the loss, to train a residual learning capability of the artifact removal model.

According to another aspect of an example embodiment of the disclosure, an artifact removal apparatus based on ML is provided, the apparatus including:

at least one memory configured to store program code; and at least one processor configured to read the program code and operate as instructed by the program code, the program code including:

first invoking code configured to cause the at least one processor to invoke an artifact removal model to predict a residual between an $i^{th}$ original image frame of a video and an image frame obtained after the $i^{th}$ original image frame is compressed, to obtain a predicted residual of the $i^{th}$ original image frame, the video comprising at least two original image frames and i being a positive integer, the first invoking code being further configured to cause the at least one processor configured to invoke the artifact removal model to add the predicted residual and the $i^{th}$ original image frame, to obtain a target image frame after artifact removal processing; and encoding code configured to cause the at least one processor to sequentially perform encoding and compression on at least two target image frames corresponding to the at least two original image frames, to obtain a video frame sequence after artifact removal.

According to another aspect of the disclosure, an apparatus for training an artifact removal model based on ML is provided, the apparatus including:

at least one memory configured to store program code; and at least one processor configured to read the program code and operate as instructed by the program code, the program code including:

obtaining code configured to cause the at least one processor to obtain a training sample, each group of training samples including an original image frame sample of a video sample and an image frame sample obtained after the original image frame sample is encoded and compressed;

invoking code configured to cause the at least one processor to invoke the artifact removal model to predict a residual between the original image frame sample and the image frame sample after the encoding and compression in the each group of training samples, to obtain a sample residual, the invoking code being further configured to cause the at least one processor to invoke the artifact removal model to add the sample residual and the image frame sample after the encoding and compression, to obtain a target image frame sample after artifact removal processing; and training code configured to cause the at least one processor to determine a loss between the target image frame sample and the original image frame sample, and adjust model parameters in the artifact removal model based on the loss, to train a residual learning capability of the artifact removal model.

According to another aspect of an example embodiment of the disclosure, an electronic device is provided, including:

a memory; and a processor connected to the memory, the processor being configured to load and execute executable instructions to implement the artifact removal method based on ML according to one or more embodiments of the foregoing aspect(s) of the disclosure.

According to another aspect of an example embodiment of the disclosure, a non-transitory computer-readable storage medium is provided, storing at least one instruction, at least one program, a code set, or an instruction set, the at least one instruction, the at least one program, the code set, or the instruction set being executable by a processor to implement the artifact removal method based on ML according to one or more embodiments of the foregoing aspect(s) of the disclosure.

According to another aspect of an example embodiment of the disclosure, a computer program product is provided, including computer instructions, the computer instructions being stored in a computer-readable storage medium and executable by a processor of a computer device to perform the artifact removal method based on ML according to one or more embodiments of the foregoing aspect(s) of the disclosure.

BRIEF DESCRIPTION OF THE DRAWINGS

To describe the technical solutions in the example embodiments of the disclosure more clearly, the following briefly introduces the accompanying drawings required for describing the embodiments. The accompanying drawings in the following description show only some of the embodiments of the disclosure, and a person of ordinary skill in the art may still derive other accompanying drawings from the accompanying drawings without creative efforts.

DETAILED DESCRIPTION

The following clearly and completely describes technical solutions in example embodiments of the disclosure with reference to the accompanying drawings.

First, several terms involved in the disclosure are explained.

Video encoding/decoding: a video compression technology, which implements video compression by reducing redundant pixels in a video image. Most important video codec standards include video coding standards H.261, H.263, and H.264 of the International Telecommunication Union, a Motion-Joint Photographic Experts Group (M-JPEG), and a series of Moving Picture Experts Group (MPEG) standards of International Organization for Standardization. In addition, the video codec standards further include a RealVideo video format on the Internet, a Windows Media Video (WMV) format, QuickTime, and the like.

Generally, video compression includes lossy compression. That is, in a process of encoding and compressing a video, due to information loss of a video image caused by operations of removing high-frequency information such as quantization and block division of pixels, negative effects including a blocking artifact, a ringing artifact, an edge burr, and the like appear. The foregoing negative effects are artifacts.

The "blocking artifact" means that in a process of encoding a video, the correlation of a video image is destroyed due to a manner in which the video image is divided into macroblocks for encoding and compression, thereby generating visible discontinuities at boundaries of small blocks.

The "ringing artifact" means that in a process of processing a video image by using a filter, the filter has an abrupt change, resulting in oscillation generated in a sharp change of grayscale of a video image outputted by the filter.

The "edge burr" refers to a random burr-like effect generated at an edge of a main body of a video image caused by a serious loss of video image content because same video images are encoded for a plurality of times.

Figure 1:
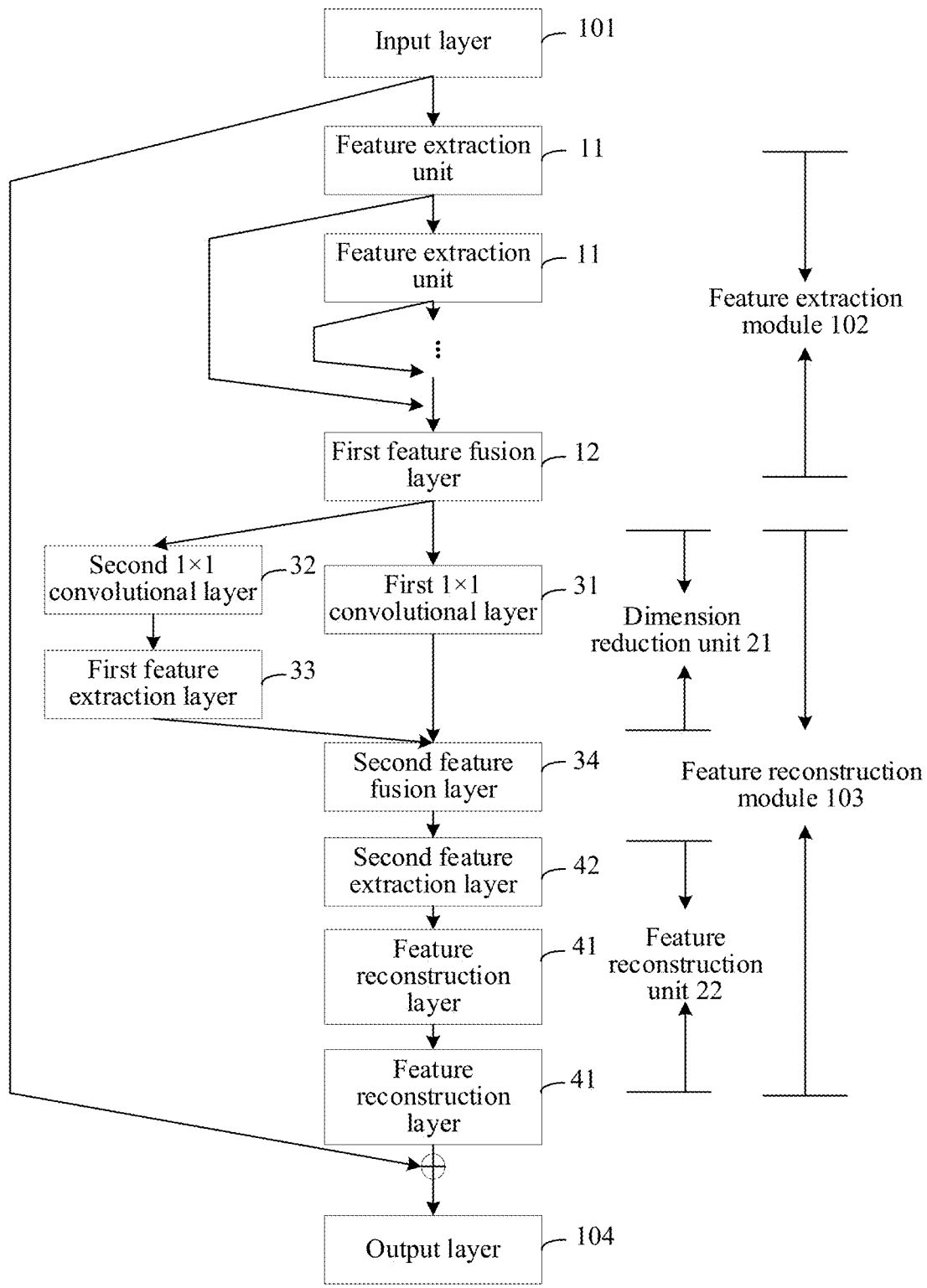
FIG. 1 is a schematic structural diagram of a framework of an artifact removal model based on machine learning (ML) according to an example embodiment of the disclosure.

The disclosure provides an artifact removal model based on machine learning (ML), to achieve a better effect of artifact removal on a video image in a process of encoding and compressing a video. FIG. 1 is a schematic structural diagram of a framework of an artifact removal model based on ML according to an example embodiment of the disclosure. As shown in FIG. 1, the artifact removal model based on ML according to an example embodiment includes:

an input layer 101, a feature extraction module 102, a feature reconstruction module 103, and an output layer 104.

The feature extraction module 102 includes at least two feature extraction units 11 and a first feature fusion layer 12. The at least two feature extraction units 11 are connected in sequence, and an input end of the feature extraction unit 11 in a header of the at least two feature extraction units 11 connected in sequence is further connected to an output end of the input layer 101; and an output end of each feature extraction unit 11 is connected to an input end of the first feature fusion layer 12.

The feature reconstruction module 103 includes a dimension reduction unit 21 and a feature reconstruction unit 22. An input end of the dimension reduction unit 21 is connected to an output end of the first feature fusion layer 12, an output end of the dimension reduction unit 21 is connected to an input end of the feature reconstruction unit 22; an output end of the feature reconstruction unit 22 is connected to an input end of the output layer 104; and the input end of the output layer 104 is further connected to an output end of the input layer 101.

In some embodiments, the dimension reduction unit 21 includes a first 1×1 convolutional layer 31.

In some embodiments, the dimension reduction unit 21 includes a first 1×1 convolutional layer 31, a second 1×1 convolutional layer 32, a first feature extraction layer 33, and a second feature fusion layer 34.

An input end of the first 1×1 convolutional layer 31 is connected to the output end of the first feature fusion layer 12, and an output end of the first 1×1 convolutional layer 31 is connected to an input end of the second feature fusion layer 34; and an input end of the second 1×1 convolutional layer 32 is connected to the output end of the first feature fusion layer 12, an output end of the second 1×1 convolutional layer 32 is connected to an input end of the first feature extraction layer 33, and an output end of the first feature extraction layer 33 is connected to the input end of the second feature fusion layer 34.

In some embodiments, a quantity of model parameters in a convolutional layer corresponding to each feature extraction unit 11 decreases, layer by layer, according to a direction away from the input layer 101. For example, the quantity of model parameters may include at least one of a size of a convolution kernel and a quantity of channels of the convolution kernel. For example, a quantity of model parameters of a first feature extraction unit 11 connected to the input layer 101 is m1, and a quantity of model parameters of a second feature extraction unit 11 connected to the first feature extraction unit 11 is m2, m1 being greater than m2, and m1 and m2 being positive integers.

In some embodiments, the feature reconstruction unit 22 includes a feature reconstruction layer 41. An input end of the feature reconstruction layer 41 is connected to an output end of the second feature fusion layer 34, and an output end of the feature reconstruction layer 41 is connected to the input end of the output layer 104. For example, the feature reconstruction layer 41 may be a 3×3 convolutional layer.

In some embodiments, the feature reconstruction unit 22 further includes a second feature extraction layer 42. The second feature extraction layer 42 is connected to the feature reconstruction layer 41, an input end of the second feature extraction layer 42 is connected to the output end of the second feature fusion layer 34, and an output end of the second feature extraction layer 42 is connected to the input end of the feature reconstruction layer 41.

For example, the feature reconstruction unit 22 in FIG. 1 includes two feature reconstruction layers 41 and one second feature extraction layer 42. The two feature reconstruction layers 41 are connected to the second feature extraction layer 42, an input end of the second feature extraction layer 42 is connected to the output end of the second feature fusion layer 34, an input end of the first feature reconstruction layer 41 is connected to the output end of the second feature extraction layer 42, an input end of the second feature reconstruction layer 41 (that is, the feature reconstruction layer 41 farther from the second feature extraction layer 42) is connected to an output end of the first feature reconstruction layer 41, and an output end of the second feature reconstruction layer 41 is connected to the input end of the output layer 104.

For example, each feature extraction layer and each feature reconstruction layer in the artifact removal model based on ML use convolutional networks. In the convolutional network, a size of a convolution kernel is 3, a step size is 1, and padding is 1, the padding being used for defining a space between an element border and element content.

An overall architecture of the artifact removal model based on ML uses a residual learning structure, and more texture details of a video frame are reserved in a process of performing feature extraction on the video frame through residual learning, so that a decompressed video frame has higher quality; and artifacts that may appear in a process of encoding and compressing a video are preprocessed by training the artifact removal model based on ML, thereby preventing a plurality of types of artifacts from noticeably appearing in the encoded and compressed video. Compared with a conventional artifact removal method in which a serial combination of different filters and a large quantity of tests are required to achieve an expected artifact removal effect, this method may save a lot of test costs and may resolve a problem of monolithic processing of the plurality of types of artifacts in the related art.

Figure 2:
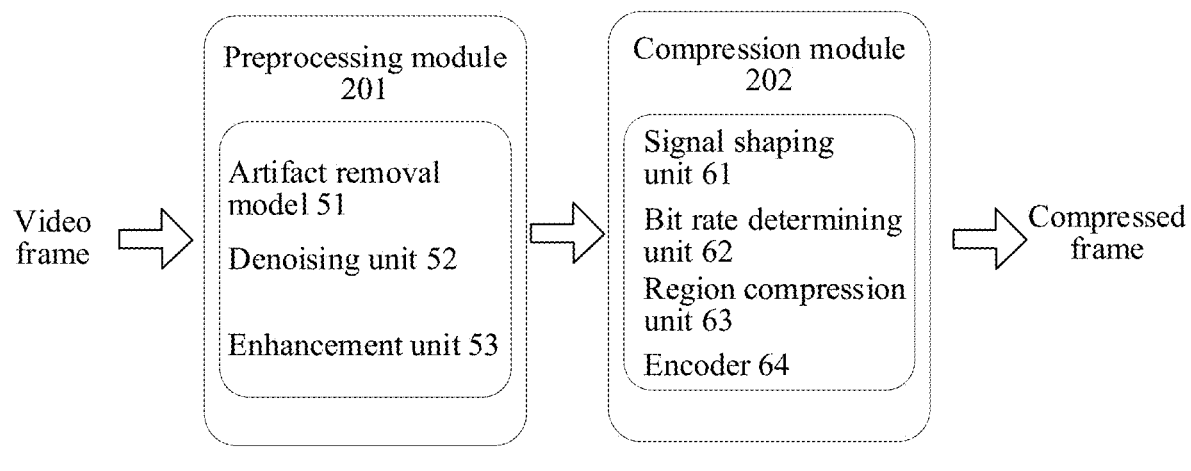
FIG. 2 is a schematic structural diagram of an application framework of an artifact removal model based on ML according to an example embodiment of the disclosure.

For example, an implementation framework 200 in which the artifact removal model based on ML performs video encoding and compression is applied, and as shown in FIG. 2, includes a preprocessing module 201 and a compression module 202. An artifact removal model 51 based on ML is disposed in the preprocessing module 201, and is configured to perform artifact removal processing before an image frame is compressed. The preprocessing module 201 further includes a denoising unit 52 and an enhancement unit 53. The denoising unit 52 is configured to remove noise in an image frame, and the enhancement unit 53 is configured to enhance signal strength of a pixel in the image frame.

The compression module 202 includes a signal shaping unit 61, a bit rate determination unit 62, a region compression unit 63, and an encoder 64. The signal shaping unit 61 is configured to shape a signal of an image frame after being compression pre-processed by using the preprocessing module 201, for example, to reduce a waveform; the bit rate determining unit 62 is configured to determine a bit rate of compressing the image frame; and the region compression unit 63 is configured to perform region-division compression on the image frame by using the encoder 64.

Finally, a compressed frame of a video is obtained through encoding and compression of the preprocessing module 201 and the compression module 202.

Figure 3:
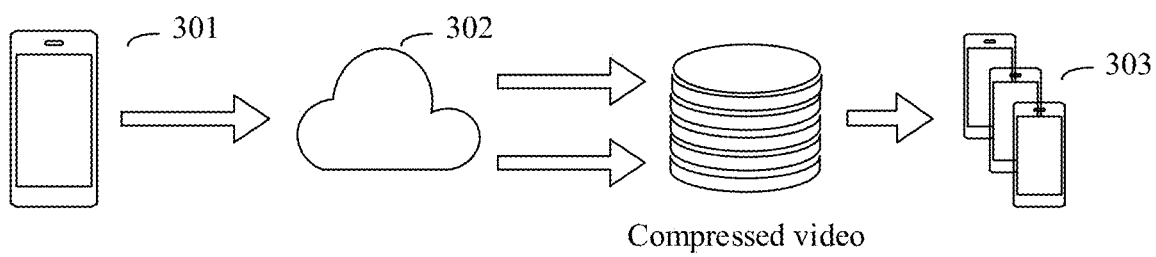
FIG. 3 is a schematic structural diagram of a computer system according to an example embodiment of the disclosure.

In some service application scenarios, the implementation framework 200 is disposed in a server, and the server encodes and compresses the video by using the implementation framework 200. FIG. 3 is a schematic structural diagram of a computer system according to an example embodiment of the disclosure. The computer system includes a first terminal 301, a server 302, and a second terminal 303.

The first terminal 301 and the second terminal 303 are respectively connected to the server 302 through a wired or wireless network.

In an example embodiment, the first terminal 301 may include at least one of a notebook computer, a desktop computer, a smart phone, and a tablet computer. For example, the first terminal 301 uploads a captured video to the server 302 through the wired or wireless network; or the first terminal 301 uploads a locally stored video to the server 302 through the wired or wireless network, and the locally stored video may be downloaded from a website or transmitted to the first terminal 301 by other devices.

The server 302 includes a memory and a processor. The memory stores a program, the program is invoked by the processor to implement operations performed on a server side in the artifact removal method based on ML provided in the disclosure. In an example embodiment, the memory stores an artifact removal model based on ML, and the artifact removal model based on ML is invoked by the processor to implement operations performed on a server side in the artifact removal method based on ML.

In an example embodiment, the memories may include, but not limited to, the following: a random access memory (RAM), a read-only memory (ROM), a programmable ROM (PROM), an erasable programmable ROM (EPROM), or an erasable programmable ROM (EPROM), and an electrically erasable programmable ROM (EEPROM).

For example, after receiving the video uploaded by the first terminal 301, the server 302 invokes the preprocessing module 201 in the implementation framework 200 to perform compression preprocessing on the video; and with respect to artifact removal processing on the video, the server 302 invokes the artifact removal model based on ML to predict a residual between an $i^{th}$ original image frame of the video and an image frame obtained after the $i^{th}$ original image frame is encoded and compressed, to obtain a predicted residual of the $i^{th}$ original image frame; and invokes the artifact removal model to add the predicted residual and the $i^{th}$ original image frame, to obtain a target image frame after artifact removal processing. After the compression preprocessing of the preprocessing module 201, the server 302 invokes the compression module 202 in the implementation framework 200 to compress the target image frame, to obtain a compressed video, i being a positive integer.

The server 302 sends the compressed video to the second terminal 303 through the wired or wireless network, and the second terminal 303 may play the compressed video through decompression.

Figure 4:
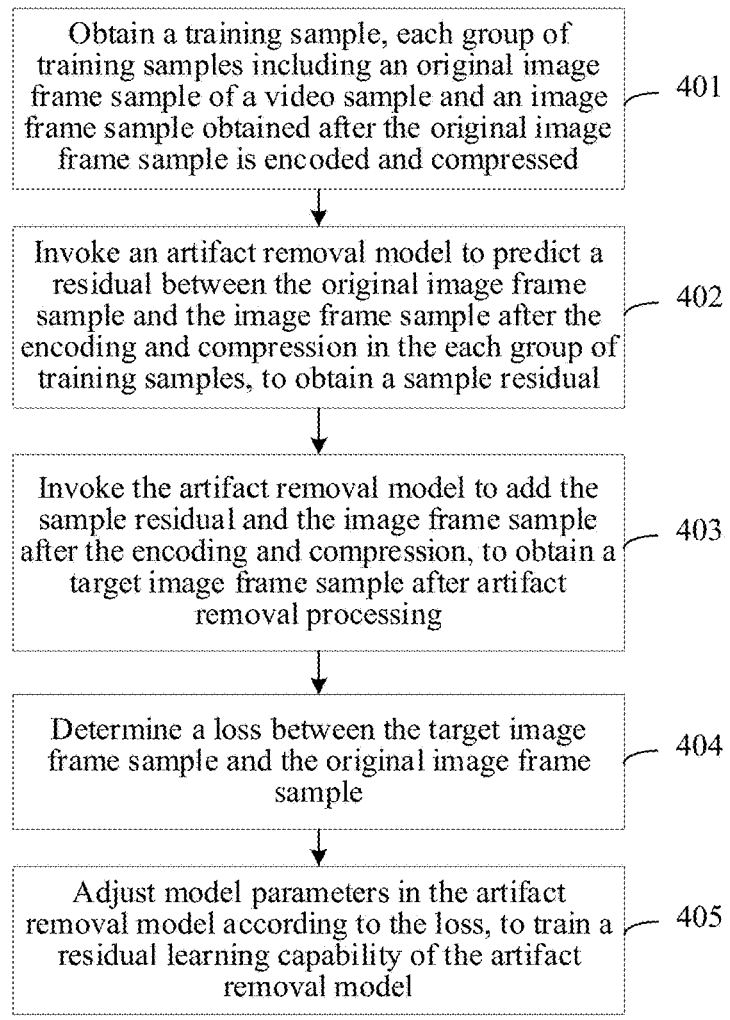
FIG. 4 is a flowchart of a method for training an artifact removal model based on ML according to an example embodiment of the disclosure.

FIG. 4 is a flowchart of a method for training an artifact removal model based on ML according to an example embodiment of the disclosure. The method is applicable to an electronic device, and the electronic device may be a terminal or a server. The method includes the following operations 401-405:

Operation 401. An electronic device obtains a training sample, each group of training samples including an original image frame sample of a video sample and an image frame sample obtained after the original image frame sample is encoded and compressed.

The training sample is a compressed video obtained by compressing an original video; n original image frame samples are randomly extracted from the original video, and n encoded and compressed image frame samples corresponding to the n original image frame samples are extracted from the compressed video; and the n original image frame samples and the n encoded and compressed image frame samples are combined in a one-to-one correspondence into n groups of training samples, n being a positive integer. That is, each group of training samples includes an original image frame sample and an image frame sample obtained after the original image frame sample is encoded and compressed.

Figure 5:
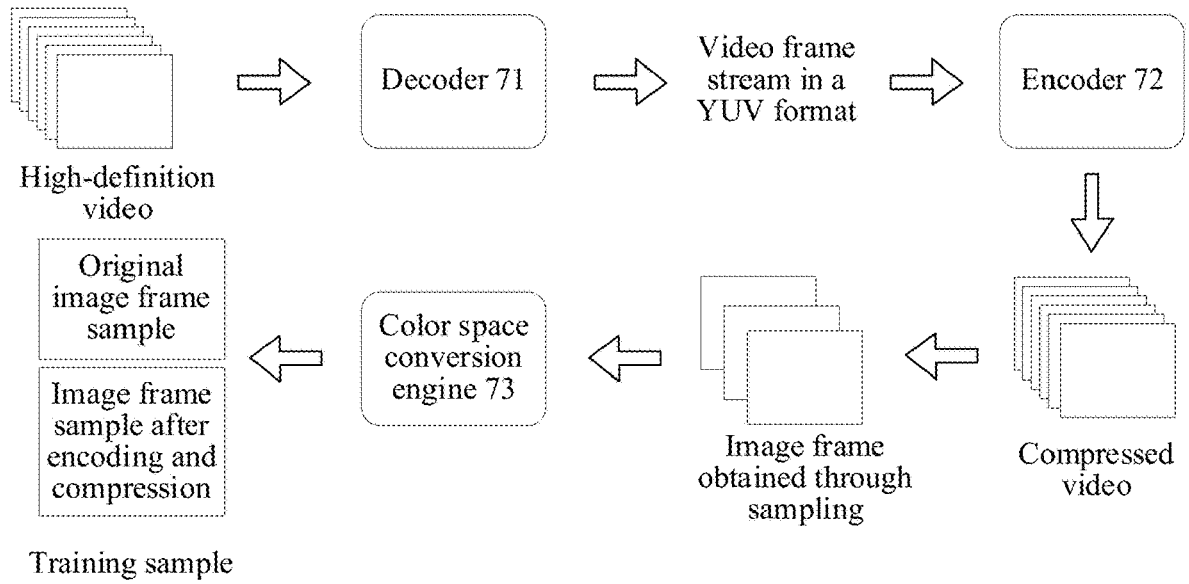
FIG. 5 is a schematic diagram of a procedure of generating a training sample according to an example embodiment of the disclosure.

For example, the generation of the training sample is described in detail. FIG. 5 is a schematic diagram of a procedure of generating a training sample according to an example embodiment of the disclosure. As shown in FIG. 5, the electronic device invokes a decoder 71 configured based on the H.264 coding standard to decapsulate a high-definition video, to obtain a video frame stream in a YUV format, where Y represents luminance or luma, that is, a grayscale value; and U and V represent chrominance or chrome, and are used for describing a color and saturation of an image for specifying a color of a pixel. Further, the electronic device invokes an encoder 72 configured based on the H.264 coding standard to encode and compress the video frame stream, to obtain a compressed video. The electronic device correspondingly extracts image frames from the original high-definition video and the compressed video, the image frame extracted from the compressed video including artifacts, for example, negative effects such as a blocking artifact, a ringing artifact, and an edge burr. Furthermore, the electronic device extracts Y channel data from each group of image frames in the YUV format as a training sample by using a color space conversion engine 73.

In the encoding stage, the electronic device randomly selects a constant rate factor (CRF) within a preset range for compression, so that artifacts included in the compressed image frame are more diversified while the compression quality is ensured. For example, the preset range of the CRF is from 30 to 60, and the electronic device selects a value within this range from 30 to 60 in the encoding stage as a CRF for this encoding and compression.

The electronic device further increases data volumes of the training samples in manners of data augmentation. For example, before training, one manner of data augmentation may be to randomly select frames on a time sequence of a video during samples selection. Another manner of data augmentation may be to perform random cutting in a pixel space according to a predetermined size, for example, to perform random cutting in a pixel space according to a size of 512×512. In a training stage, manners of data augmentation such as vertical flipping, horizontal flipping, or 90-degree rotation may be used. For example, after obtaining the training sample by using the method shown in FIG. 5, the electronic device performs vertical flipping, horizontal flipping, 90-degree rotation, or the like on the training sample, to obtain more training samples.

Operation 402. The electronic device invokes an artifact removal model to predict a residual between the original image frame sample and the image frame sample after the encoding and compression in the each group of training samples, to obtain a sample residual.

In an example embodiment, operations of learning, by the electronic device, a sample residual by using the artifact removal model are as follows:

1) The electronic device invokes the artifact removal model to perform feature extraction on the image frame sample after the encoding and compression, to obtain a sample feature vector of the image frame sample after the encoding and compression.

In an example embodiment, the artifact removal model includes at least two feature extraction units and a first feature fusion layer, the at least two feature extraction units being connected in sequence, and an output end of each feature extraction unit being further connected to an input end of the first feature fusion layer. The electronic device invokes each of the at least two feature extraction units to perform feature extraction on the original image frame sample, to obtain at least two sample feature subvectors; and invokes the first feature fusion layer to fuse the at least two sample feature subvectors, to obtain the sample feature vector.

For example, the artifact removal model includes five feature extraction units and one feature fusion layer. The electronic device inputs each group of training samples into a first feature extraction unit, and the first feature extraction unit performs feature extraction on the training sample, to obtain a sample feature subvector $A_1$; the electronic device inputs the sample feature subvector $A_1$ into a second feature extraction unit, and the second feature extraction unit performs feature extraction on the sample feature subvector $A_1$, to obtain a sample feature subvector $A_2$; similarly, a third feature extraction unit performs feature extraction on the sample feature subvector $A_2$, to obtain a sample feature subvector $A_3$, a fourth feature extraction unit performs feature extraction on the sample feature subvector $A_3$, to obtain a sample feature subvector $A_4$, and a fifth feature extraction unit performs feature extraction on the sample feature subvector $A_4$, to obtain a sample feature subvector $A_5$; and the sample feature subvectors $A_1$, $A_2$, $A_3$, $A_4$ and $A_5$ are inputted to the first feature fusion layer for feature fusion, to obtain a sample feature vector $A_1A_2A_3A_4A_5$, the sample feature vector $A_1A_2A_3A_4A_5$ being obtained by cascading the sample feature subvectors $A_1$, $A_2$, $A_3$, $A_4$ and $A_5$.

In an example embodiment, a quantity of model parameters in each of the at least two feature extraction units connected in sequence decreases layer by layer according to a direction close to the first feature fusion layer.

2) The electronic device invokes the artifact removal model to perform dimension reduction on the sample feature vector, to obtain a sample feature vector after the dimension reduction.

The electronic device invokes the artifact removal model to perform dimension reduction on the sample feature vector. In an example embodiment, the artifact removal model may include a first 1×1 convolutional layer. The electronic device performs dimension reduction on the sample feature vector by using the first 1×1 convolutional layer, to obtain a sample feature vector after the dimension reduction.

In an example embodiment, the artifact removal model may include a first 1×1 convolutional layer, a second 1×1 convolutional layer, a first feature extraction layer, and a second feature fusion layer. The first 1×1 convolutional layer is invoked to perform dimension reduction on the sample feature vector, to obtain a first sample feature vector after the dimension reduction; the second 1×1 convolutional layer is invoked to perform dimension reduction on the sample feature vector, to obtain a second sample feature vector after the dimension reduction; the first feature extraction layer is invoked to perform feature extraction on the second sample feature vector, to obtain a second sample feature vector after the feature extraction; and the second feature fusion layer is invoked to fuse the first sample feature vector with the second sample feature vector after the feature extraction, to obtain the sample feature vector after the dimension reduction.

For example, the electronic device invokes the first 1×1 convolutional layer in the artifact removal model to perform dimension reduction on the sample feature vector $A_1A_2A_3A_4A_5$, to obtain a first sample feature vector $B_1$ after the dimension reduction; invokes the second 1×1 convolutional layer to perform dimension reduction on the sample feature vector $A_1A_2A_3A_4A_5$, to obtain a second sample feature vector $B_2$ after the dimension reduction; invokes the first feature extraction layer to perform feature extraction on the second sample feature vector $B_2$, to obtain a second sample feature vector $B_3$ after the feature extraction; and invokes the second feature fusion layer to fuse the first sample feature vector $B_1$ with the second sample feature vector $B_3$ after the feature extraction, to obtain the sample feature vector $B_1B_3$ after the dimension reduction.

3) The electronic device invokes the artifact removal model to perform feature reconstruction on the sample feature vector after the dimension reduction, to obtain the sample residual.

In an example embodiment, the artifact removal model includes a feature reconstruction layer, and feature reconstruction is performed on the sample feature vector after the dimension reduction by using the feature reconstruction layer, to obtain the sample residual. For example, the artifact removal model includes a 3×3 convolutional layer, and feature reconstruction is performed on the sample feature vector after the dimension reduction by using the 3×3 convolutional layer, to obtain the sample residual.

In an example embodiment, the artifact removal model includes at least two feature reconstruction layers, and feature reconstruction is performed on the sample feature vector after the dimension reduction by using the at least two feature reconstruction layers connected in sequence, to obtain the sample residual. For example, the artifact removal model includes at least two 3×3 convolutional layers connected in sequence, and feature reconstruction is performed on the sample feature vector after the dimension reduction by using the at least two 3×3 convolutional layers connected in sequence, to obtain the sample residual.

Operation 403. The electronic device invokes the artifact removal model to add the sample residual and the image frame sample after the encoding and compression, to obtain a target image frame sample after artifact removal processing.

Operation 404. The electronic device determines a loss between the target image frame sample and the original image frame sample.

The electronic device invokes a loss function in the artifact removal model to calculate the loss between the target image frame sample and the original image frame sample corresponding to the target image frame sample, for example, an average absolute error, a mean square error, or an average deviation error between the target image frame sample and the original image frame sample corresponding to the target image frame sample.

Operation 405. The electronic device adjusts model parameters in the artifact removal model according to the loss, to train a residual learning capability of the artifact removal model.

The artifact removal model in the electronic device back propagates the calculated loss, and the electronic device adjusts model parameters in the artifact removal model by using the loss, to train a residual learning capability of the artifact removal model. For example, the artifact removal model in the electronic device back propagates the average absolute error, and the electronic device adjusts model parameters in the artifact removal model by using the average absolute error, to train a residual learning capability of the artifact removal model.

As described above, in the method for training an artifact removal model based on ML provided in this embodiment, the artifact removal model that uses the residual learning structure is trained, so that the artifact removal model after the training may accurately reserve more texture details of the video frame in the process of performing feature extraction on the video frame through residual learning, and consequently the decompressed video frame has higher quality. Further, artifacts that may appear in a process of encoding and compressing a video may be preprocessed by using the artifact removal model obtained through training, thereby preventing various types of artifacts from noticeably appearing in the encoded and compressed video. Compared with a conventional artifact removal method in which a serial combination of different filters and a large quantity of tests are required to achieve an expected artifact removal effect, this method according to an example embodiment may save a lot of test costs and may resolve a problem of monolithic processing of the plurality of types of artifacts. Furthermore, the obtaining of the training sample is generated by using an automated program, which may reduce labor costs consumed by manual operation.

Figure 6:
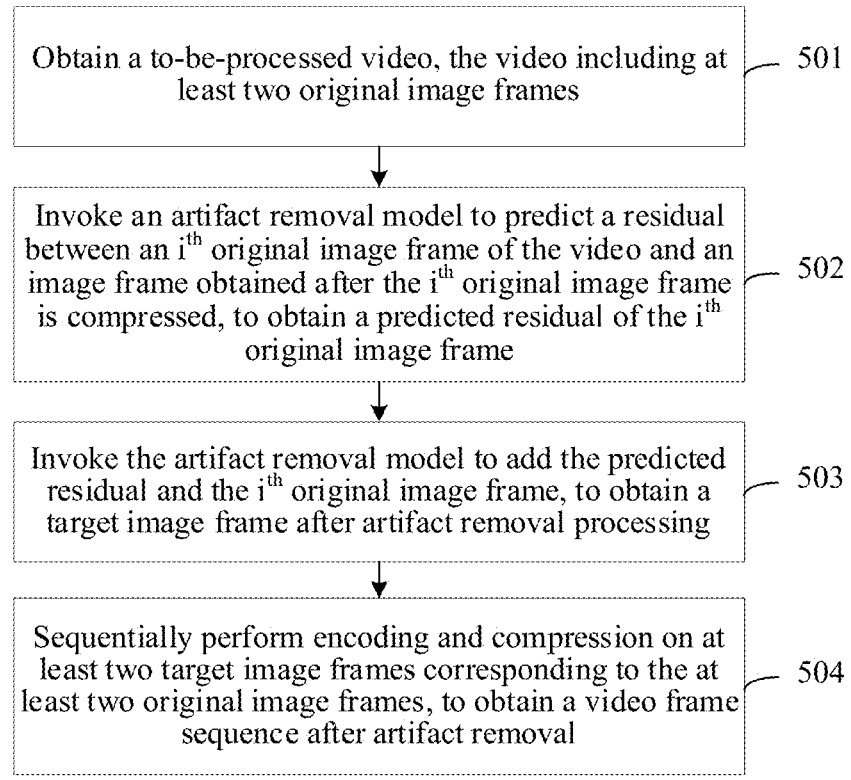
FIG. 6 is a flowchart of an artifact removal method based on ML according to an example embodiment of the disclosure.

FIG. 6 is a flowchart of an artifact removal method based on ML according to an example embodiment of the disclosure. The method is applicable to an electronic device, which may be a terminal or a server, and may be provided with an artifact removal model. The method includes the following operations 501-504:

Operation 501. An electronic device obtains a video, the video including at least two original image frames.

The video may be a video uploaded to the electronic device through a physical interface on the electronic device, or may be a video transmitted to the electronic device through a wired or wireless network. For example, the electronic device may be a server. The terminal sends a video to the server through the wired or wireless network, and the server receives and obtains the video.

Operation 502. The electronic device invokes an artifact removal model to predict a residual between an $i^{th}$ original image frame of the video and an image frame obtained after the $i^{th}$ original image frame is compressed, to obtain a predicted residual of the $i^{th}$ original image frame.

In an example embodiment, the electronic device invokes the artifact removal model to perform residual learning on the video, as follows:

1) The electronic device invokes the artifact removal model to perform feature extraction on the $i^{th}$ original image frame, to obtain a feature vector of the $i^{th}$ original image frame.

In an example embodiment, the artifact removal model includes at least two feature extraction units and a first feature fusion layer, the at least two feature extraction units being connected in sequence, and an output end of each feature extraction unit being further connected to an input end of the first feature fusion layer. The electronic device invokes each of the at least two feature extraction units to perform feature extraction on the $i^{th}$ original image frame, to obtain at least two feature subvectors; and invokes the first feature fusion layer to fuse the at least two feature subvectors, to obtain the feature vector.

For example, the artifact removal model includes three feature extraction units and one feature fusion layer. The electronic device inputs each original image frame into a first feature extraction unit, and the first feature extraction unit performs feature extraction on the original image frame, to obtain a feature subvector $C_1$; the electronic device inputs the feature subvector $C_1$ into a second feature extraction unit, and the second feature extraction unit performs feature extraction on the feature subvector $C_1$, to obtain a feature subvector $C_2$; the electronic device inputs the feature subvector $C_2$ into a third feature extraction unit, and the third feature extraction unit performs feature extraction on the feature subvector $C_2$, to obtain a feature subvector $C_3$; and the electronic device inputs the feature subvectors $C_1$, $C_2$, and $C_3$ into the first feature fusion layer for feature fusion, to obtain the sample feature vector $C_1C_2C_3$.

In an example embodiment, a quantity of model parameters in a convolutional layer corresponding to each of the at least two feature extraction units connected in sequence decreases layer by layer according to a direction close to the feature fusion layer. For example, in the three feature extraction units connected in sequence, there are 10000 model parameters in a convolutional layer corresponding to the first feature extraction unit, 5000 model parameters in a convolutional layer corresponding to the second feature extraction unit, and 3000 model parameters in a convolutional layer corresponding to the third feature extraction unit. The artifact removal model in the electronic device obtains the feature vector through extraction by using the at least two feature extraction units connected in sequence.

2) The electronic device invokes the artifact removal model to perform dimension reduction on the feature vector, to obtain a feature vector after the dimension reduction.

In an example embodiment, the artifact removal model includes a first 1×1 convolutional layer, and the electronic device performs dimension reduction on each feature vector by using the first 1×1 convolutional layer in the artifact removal model, to obtain a feature vector after the dimension reduction.

In an example embodiment, the artifact removal model includes the first 1×1 convolutional layer, a second 1×1 convolutional layer, a first feature extraction layer, and a second feature fusion layer. The electronic device invokes the first 1×1 convolutional layer to perform dimension reduction on the feature vector, to obtain a first feature vector after the dimension reduction; invokes the second 1×1 convolutional layer to perform dimension reduction on the feature vector, to obtain a second feature vector after the dimension reduction; invokes the first feature extraction layer to perform feature extraction on the second feature vector, to obtain a second feature vector after the feature extraction; and invokes the second feature fusion layer to fuse the first feature vector with the second feature vector after the feature extraction, to obtain the feature vector after the dimension reduction.

3) The electronic device invokes the artifact removal model to perform feature reconstruction on the feature vector after the dimension reduction, to obtain the predicted residual between the $i^{th}$ original image frame and the image frame obtained after the $i^{th}$ original image frame is compressed.

In an example embodiment, the artifact removal model includes a feature reconstruction layer. The electronic device performs feature reconstruction on the feature vector after the dimension reduction by using the feature reconstruction layer in the artifact removal model, to obtain the predicted residual between the $i^{th}$ original image frame and the image frame obtained after the $i^{th}$ original image frame is compressed. For example, the feature reconstruction layer is a 3×3 convolutional layer. The electronic device performs feature reconstruction on the feature vector after the dimension reduction by using the 3×3 convolutional layer in the artifact removal model, to obtain the predicted residual between the original image frame and the image frame obtained after the $i^{th}$ original image frame is compressed.

In an example embodiment, the artifact removal model includes at least two feature reconstruction layers connected in sequence. The electronic device performs feature reconstruction on the feature vector after the dimension reduction by using the at least two feature reconstruction layers in the artifact removal model, to obtain the predicted residual between the $i^{th}$ original image frame and the image frame obtained after the $i^{th}$ original image frame is compressed. For example, the artifact removal model includes at least two 3×3 convolutional layers connected in sequence. The electronic device performs feature reconstruction on the feature vector after the dimension reduction by using the at least two 3×3 convolutional layers in the artifact removal model, to obtain the predicted residual. In an example embodiment, the artifact removal model further includes a second feature extraction layer. The electronic device performs feature extraction on the feature vector after the dimension reduction by using the second feature extraction layer in the artifact removal model, to obtain a candidate feature vector; and inputs the candidate feature vector into the at least two feature reconstruction layers for feature reconstruction, to obtain the predicted residual between original $i^{th}$ image frame and the image frame obtained after the $i^{th}$ original image frame is compressed.

Operation 503. The electronic device invokes the artifact removal model to add the predicted residual and the $i^{th}$ original image frame, to obtain a target image frame after artifact removal processing.

The electronic device invokes the artifact removal model to add the predicted residual of the $i^{th}$ original image frame and the $i^{th}$ original image frame, to obtain the target image frame after the artifact removal processing, and correspondingly, at least two original image frames correspondingly obtain at least two target image frames.

The operation of invoking, by the electronic device, the artifact removal model to add the predicted residual and the $i^{th}$ original image frame, to obtain a target image frame may be an operation of performing, by the electronic device, compression preprocessing on the video. That is, before compressing the video, the electronic device needs to perform artifact removal processing.

Operation 504. The electronic device sequentially performs encoding and compression on at least two target image frames corresponding to the at least two original image frames, to obtain a video frame sequence after artifact removal.

The electronic device is provided with an encoding and compression module, and sequentially performs encoding and compression on the at least two target image frames by using the encoding compression module, to obtain the video frame sequence after the artifact removal. The video frame sequence after the artifact removal is the video frame after being encoded and compressed. A video played by a user on the terminal is obtained by decompressing the video frame sequence after the artifact removal.

As described above, in the artifact removal method based on ML provided in this embodiment, artifacts that may be generated in a process of compressing a video is preprocessed by using an artifact removal model using a residual learning structure, and more texture details of a video frame are accurately reserved in a process of performing feature extraction on the video frame through residual learning, so that a compressed and decompressed video frame has higher quality; and artifacts that may appear in a process of encoding and compressing the video are preprocessed by using the artifact removal model, thereby preventing a plurality of types of artifacts from noticeably appearing in the encoded and compressed video. Compared with a conventional artifact removal method in which a serial combination of different filters and a large quantity of tests are required to achieve an expected artifact removal effect, this method may save a lot of test costs, may avoid a problem of monolithic processing of the plurality of types of artifacts, and may further achieve adaptive strength by using a generalization ability of the model.

For example, a peak signal-to-noise ratio (PSNR) is used for measuring image quality, and structural similarity index measure (SSIM) is used for measuring a similarity between two images. In an experiment, two indexes, namely, the PSNR and the SSIM are used for performing a performance test on the artifact removal model. First, in a compressed video with a CRF value from 20 to 40, one frame corresponding to each value is randomly selected as a test set. Second, changes of objective indexes to which the artifact removal model performs artifact removal on the video are observed when a quantity of model parameters is limited to 26,436. As shown in Table 1, all the objective indexes are increased, and subjective quality evaluation is improved. That is, both the PSNR and the SSIM are increased.

TABLE 1

| Quantity of parameters | Input a PSNR | Output the PSNR | A difference between the inputted PSNR and the outputted PSNR | Input SSIM | Output SSIM | A difference between the inputted SSIM and the outputted SSIM |
|---|---|---|---|---|---|---|
| 26,436 | 33.09105 | 33.388595 | 0.297545 | 0.894036 | 0.898017 | 0.003981 |

Figure 7:
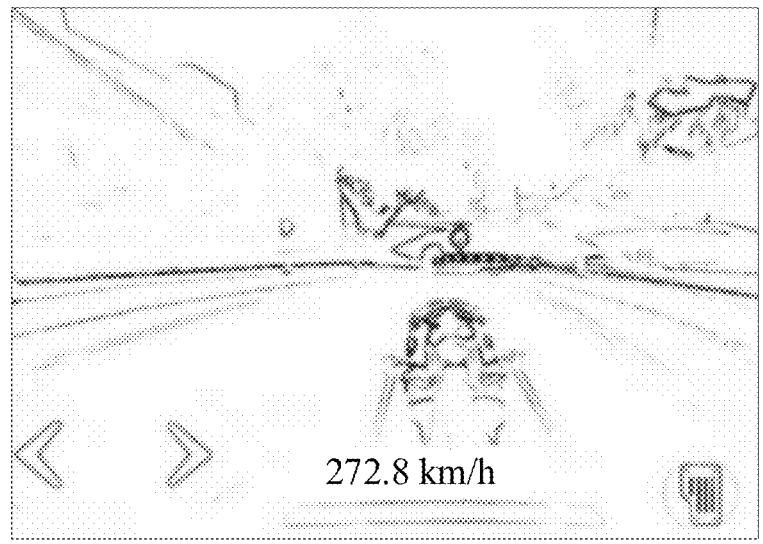
FIG. 7 is a schematic diagram of displaying a video frame that is not processed by using an artifact removal model after being decompressed according to an example embodiment of the disclosure.
Figure 8:
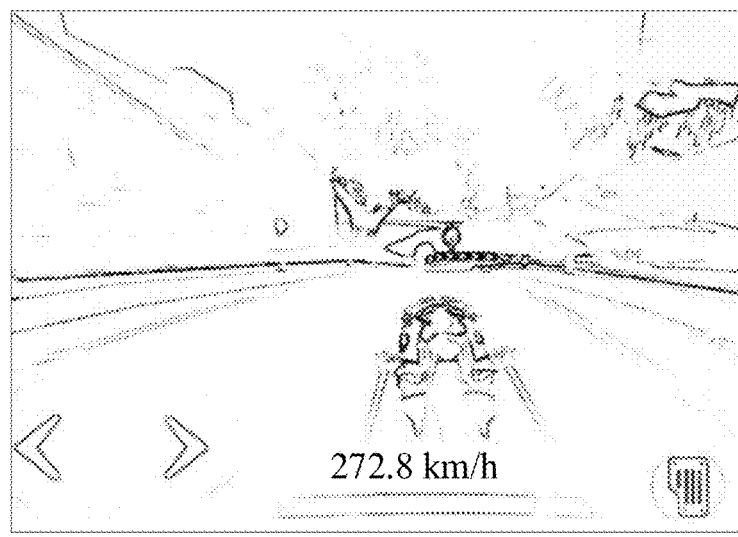
FIG. 8 is a schematic diagram of displaying a video frame that is processed by using an artifact removal model after being decompressed according to an example embodiment of the disclosure.
Figure 9:
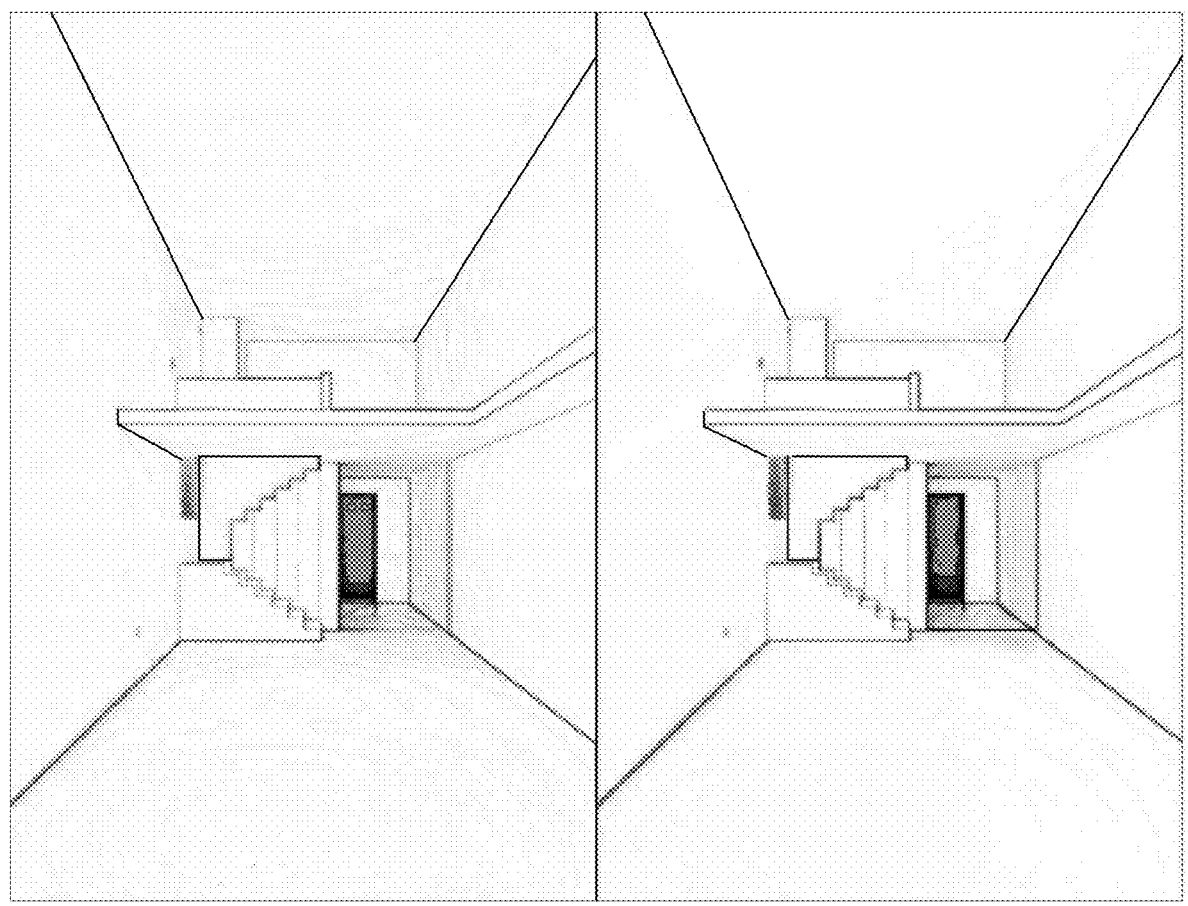
FIG. 9 is a schematic diagram of a display comparison between a video frame that is not processed by using an artifact removal model after being decompressed and a video frame that is processed by using the artifact removal model after being decompressed according to an example embodiment of the disclosure.

FIG. 7 shows a decompression effect before the artifact removal model performs artifact removal processing. FIG. 8 shows a decompression effect after artifact removal processing. Referring to FIGS. 7 and 8, it is shown that burrs in the figure are significantly reduced, a contour is cleaner, and subjective quality is significantly enhanced. An effect that the artifact removal model removes ringing artifacts is further used as an example for description. FIG. 9 is a schematic diagram of a display comparison between a video frame that is not processed by using an artifact removal model after being decompressed and a video frame that is processed by using the artifact removal model after being decompressed according to an example embodiment of the disclosure. As shown in FIG. 9, the left figure is an original image frame that is not processed by using the artifact removal model, and the right figure is an image frame that is processed by using the artifact removal model. It is shown through comparison that there are a lot of ringing artifacts in central areas of an upper half and a lower half of an image, and the ringing artifacts may be effectively removed through processing by using the artifact removal model according to an example embodiment.

The artifact removal method based on ML according to an example embodiment is widely applicable to different video-related application scenarios such as a scenario of an online video, an online game scene, a scenario of video surveillance, and a scenario of video publishing.

An example in which the artifact removal method according to an example embodiment is applicable to a multiplayer online game scene is used for description. In this example, a first game terminal receives an operation event triggered by a user, and reports an operation time to a server; the server updates a video picture of an online game according to the operation event reported by the first game terminal; the server is provided with an artifact removal model, and the server invokes the artifact removal model to perform artifact removal processing on the updated video picture, and to encode and compress the video picture through the artifact removal processing, and sends the encoded and compressed video picture to the first game terminal and a second game terminal; and the first game terminal and the second game terminal respectively decompress and play the encoded and compressed video picture.

An example in which the artifact removal method according to an example embodiment is applicable to a scenario of an online video conference is used for description. In this example, a first terminal records a picture within a shooting range by using a camera, and uploads a video obtained through recording to a server; the server is provided with an artifact removal model, and the server invokes the artifact removal model to perform artifact removal processing on the video uploaded by the first terminal, and to encode and compress the video picture through the artifact removal processing, and sends the encoded and compressed video picture to a second terminal; and the second terminal decompresses and plays the encoded and compressed video picture. Also, the second terminal records a video, and a corresponding server sends an encoded and compressed video through artifact removal processing to the first terminal for playback.

An example in which the artifact removal method according to an example embodiment is applicable to a scenario of video publishing is used for description. In this example, a first terminal uploads a stored video to a server; the server is provided with an artifact removal model, and the server invokes the artifact removal model to perform artifact removal processing on the video uploaded by the first terminal, and to encode and compress a video picture through the artifact removal processing, and sends the encoded and compressed video picture to a second terminal; and the second terminal plays the video after receiving a playback operation triggered by a user for the video.

In the foregoing different application scenarios, the artifact removal methods based on ML may effectively remove a plurality of types of artifacts in the encoded and compressed video, thereby improving uses' visual experience.

The words "first" and "second" in the disclosure do not have any sorting meaning, and are only used for distinguishing different things. For example, the words "first" and "second" in the "first game terminal" and the "second game terminal" are used for distinguishing two different game terminals.

Figure 10:
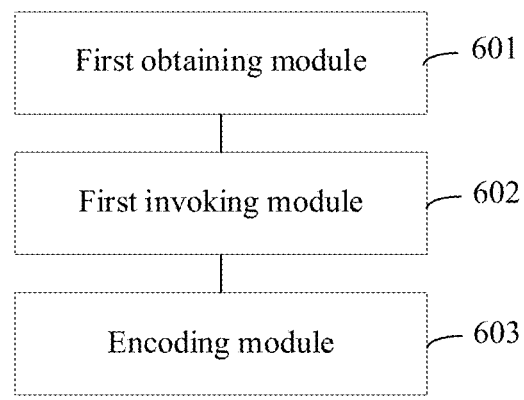
FIG. 10 is a block diagram of an artifact removal apparatus based on ML according to an example embodiment of the disclosure.

FIG. 10 is a block diagram of an artifact removal apparatus based on ML according to an example embodiment of the disclosure. The apparatus implements as a part or all of a terminal or a server by using software, hardware or a combination thereof. The apparatus includes:

a first obtaining module 601, configured to obtain a video, the video including at least two original image frames;

a first invoking module 602, configured to invoke an artifact removal model to predict a residual between an $i^{th}$ original image frame of the video and an image frame obtained after the $i^{th}$ original image frame is compressed, to obtain a predicted residual of the $i^{th}$ original image frame, i being a positive integer, the first invoking module 602 being configured to invoke the artifact removal model to add the predicted residual and the $i^{th}$ original image frame, to obtain a target image frame after artifact removal processing; and an encoding module 603, configured to sequentially perform encoding and compression on at least two target image frames corresponding to the at least two original image frames, to obtain a video frame sequence after artifact removal.

In some embodiments, the first invoking module 602 is configured to: invoke the artifact removal model to perform feature extraction on the $i^{th}$ original image frame, to obtain a feature vector of the $i^{th}$ original image frame; invoke the artifact removal model to perform dimension reduction on the feature vector, to obtain a feature vector after the dimension reduction; and invoke the artifact removal model to perform feature reconstruction on the feature vector after the dimension reduction, to obtain the predicted residual.

In some embodiments, the artifact removal model includes at least two feature extraction units and a first feature fusion layer, the at least two feature extraction units being connected in sequence, and an output end of each feature extraction unit being further connected to an input end of the first feature fusion layer.

The first invoking module 602 is configured to: invoke each of the at least two feature extraction units to perform feature extraction on the $i^{th}$ original image frame, to obtain at least two feature subvectors; and invoke the first feature fusion layer to fuse the at least two feature subvectors, to obtain the feature vector.

In some embodiments, the artifact removal model includes a first 1×1 convolutional layer, a second 1×1 convolutional layer, a first feature extraction layer, and a second feature fusion layer.

The first invoking module 602 is configured to: invoke the first 1×1 convolutional layer to perform dimension reduction on the feature vector, to obtain a first feature vector after the dimension reduction; invoke the second 1×1 convolutional layer to perform dimension reduction on the feature vector, to obtain a second feature vector after the dimension reduction; invoke the first feature extraction layer to perform feature extraction on the second feature vector, to obtain a second feature vector after the feature extraction; and invoke the second feature fusion layer to fuse the first feature vector with the second feature vector after the feature extraction, to obtain the feature vector after the dimension reduction.

As described above, in the artifact removal apparatus based on ML provided in this embodiment, artifacts that may be generated in a process of compressing a video is preprocessed by using an artifact removal model using a residual learning structure, and more texture details of a video frame are accurately reserved in a process of performing feature extraction on the video frame through residual learning, so that a compressed and decompressed video frame has higher quality; and artifacts that may appear in a process of encoding and compressing a video are preprocessed by using the artifact removal model, thereby preventing a plurality of types of artifacts from noticeably appearing in the encoded and compressed video. Compared with a conventional artifact removal method in which a serial combination of different filters and a large quantity of tests are required to achieve an expected artifact removal effect, this method may save a lot of test costs, may avoid a problem of monolithic processing of the plurality of types of artifacts, and may further achieve adaptive strength by using a generalization ability of the model.

Figure 11:
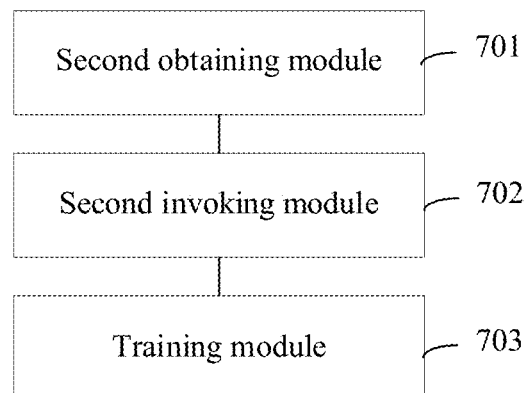
FIG. 11 is a block diagram of an apparatus for training an artifact removal model based on ML according to an example embodiment of the disclosure.

FIG. 11 is a block diagram of an apparatus for training an artifact removal model based on ML according to an example embodiment of the disclosure. The apparatus implements as a part or all of a terminal or a server by using software, hardware or a combination thereof. The apparatus includes:

a second obtaining module 701, configured to obtain a training sample, each group of training samples including an original image frame sample of a video sample and an image frame sample obtained after the original image frame sample is encoded and compressed;

a second invoking module 702, configured to invoke the artifact removal model to predict a residual between the original image frame sample and the image frame sample after the encoding and compression in the each group of training samples, to obtain a sample residual, the second invoking module 702 being configured to invoke the artifact removal model to add the sample residual and the image frame sample after the encoding and compression, to obtain a target image frame sample after artifact removal processing; and a training module 703, configured to determine a loss between the target image frame sample and the original image frame sample, and adjust model parameters in the artifact removal model according to the loss, to train a residual learning capability of the artifact removal model.

In some embodiments, the second invoking module 702 is configured to: invoke the artifact removal model to perform feature extraction on the image frame sample after the encoding and compression, to obtain a sample feature vector of the image frame sample after the encoding and compression; invoke the artifact removal model to perform dimension reduction on the sample feature vector, to obtain a sample feature vector after the dimension reduction; and invoke the artifact removal model to perform feature reconstruction on the sample feature vector after the dimension reduction, to obtain the sample residual.

In some embodiments, the artifact removal model includes at least two feature extraction units and a first feature fusion layer, the at least two feature extraction units being connected in sequence, and an output end of each feature extraction unit being further connected to an input end of the first feature fusion layer.

The second invoking module 702 is configured to: invoke each of the at least two feature extraction units to perform feature extraction on the original image frame sample, to obtain at least two sample feature subvectors; and invoke the first feature fusion layer to fuse the at least two sample feature subvectors, to obtain the sample feature vector.

In some embodiments, the artifact removal model includes a first 1×1 convolutional layer, a second 1×1 convolutional layer, a first feature extraction layer, and a second feature fusion layer.

The second invoking module 702 is configured to: invoke the first 1×1 convolutional layer to perform dimension reduction on the sample feature vector, to obtain a first sample feature vector after the dimension reduction; invoke the second 1×1 convolutional layer to perform dimension reduction on the sample feature vector, to obtain a second sample feature vector after the dimension reduction; invoke the first feature extraction layer to perform feature extraction on the second sample feature vector, to obtain a second sample feature vector after the feature extraction; and invoke the second feature fusion layer to fuse the first sample feature vector with the second sample feature vector after the feature extraction, to obtain the sample feature vector after the dimension reduction.

As described above, in the apparatus for training an artifact removal model based on ML provided in this embodiment, the artifact removal model that uses the residual learning structure is trained, so that the artifact removal model after the training may accurately reserve more texture details of the video frame in the process of performing feature extraction on the video frame through residual learning, and consequently the decompressed video frame has higher quality. Further, artifacts that may appear in a process of encoding and compressing a video may be preprocessed by using the artifact removal model obtained through training, thereby preventing a plurality of types of artifacts from noticeably appearing in the encoded and compressed video. Compared with a conventional artifact removal method in which a serial combination of different filters and a large quantity of tests are required to achieve an expected artifact removal effect, this method may save a lot of test costs and may avoid a problem of monolithic processing of the plurality of types of artifacts.

Figure 12:
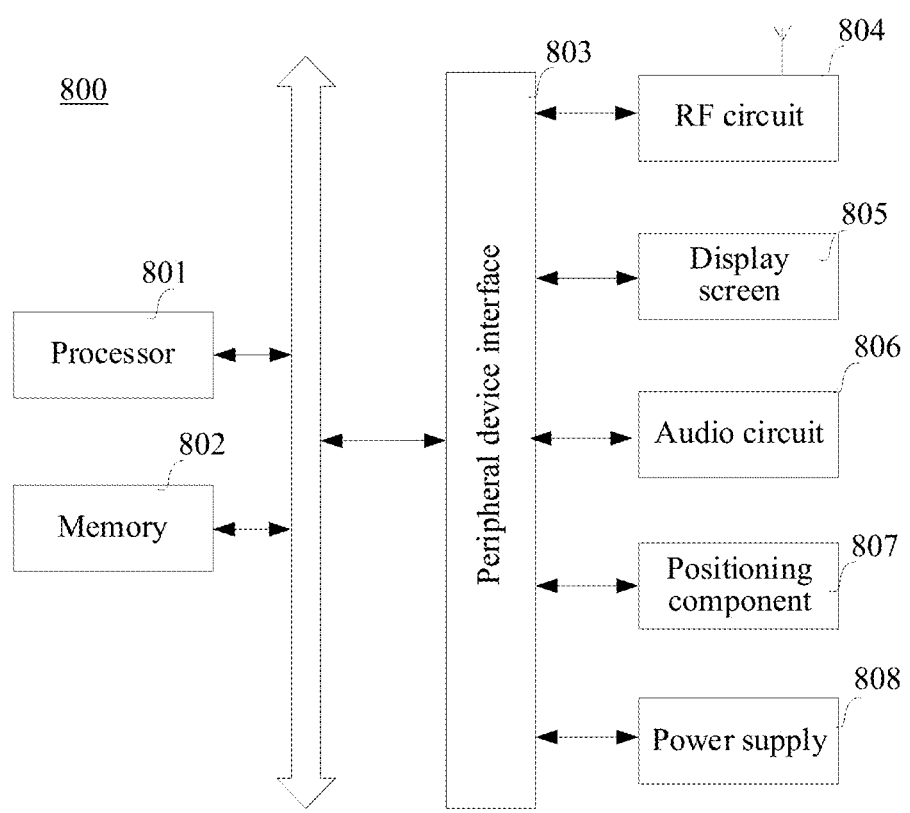
FIG. 12 is a schematic structural diagram of a terminal according to an example embodiment of the disclosure.

FIG. 12 is a structural block diagram of a terminal 800 according to an example embodiment of the disclosure. The terminal 800 may be a smartphone, a tablet computer, a moving picture experts group audio layer III (MP3) player, a moving picture experts group audio layer IV (MP4) player, a notebook computer, or a desktop computer. The terminal 800 may also be referred to other names such as a user device, or a portable terminal, a laptop computer, or a desktop terminal.

Generally, the terminal 800 includes a processor 801 and a memory 802.

The processor 801 may include one or more processing cores, for example, a 4-core processor or an 8-core processor. The processor 801 may be implemented by using at least one hardware form of a digital signal processor (DSP), a field-programmable gate array (FPGA), and a programmable logic array (PLA). The processor 801 may alternatively include a main processor and a coprocessor. The main processor is a processor configured to process data in an awake state, and is also referred to as a central processing unit (CPU). The coprocessor is a low power consumption processor configured to process the data in a standby state. In some embodiments, the processor 801 may be integrated with a graphics processing unit (GPU). The GPU is configured to render and draw content that needs to be displayed on a display screen. In some embodiments, the processor 801 may further include an AI processor. The AI processor is configured to process computing operations related to ML.

The memory 802 may include one or more computer-readable storage media. The computer-readable storage media may be non-transient (or non-transitory). The memory 802 may further include a high-speed RAM and a non-volatile memory, for example, one or more disk storage devices or flash memory devices. In some embodiments, the non-transitory computer-readable storage medium in the memory 802 is configured to store at least one instruction, the at least one instruction being configured to be executed by the processor 801 to implement the artifact removal method based on ML and the method for training an artifact removal model based on ML provided in the method embodiments of the disclosure.

In some embodiments, the terminal 800 may include a peripheral device interface 803 and at least one peripheral device. The processor 801, the memory 802, and the peripheral device interface 803 may be connected through a bus or a signal line. Each peripheral device may be connected to the peripheral device interface 803 through a bus, a signal cable, or a circuit board. Specifically, the peripheral device includes at least one of a radio frequency circuit 804, a display screen 805, an audio circuit 806, a positioning component 807, and a power supply 808.

The peripheral device interface 803 may be configured to connect the at least one peripheral device related to input/output (I/O) to the processor 801 and the memory 802. In some embodiments, the processor 801, the memory 802, and the peripheral device interface 803 are integrated on the same chip or circuit board. In some other embodiments, any one or two of the processor 801, the memory 802, and the peripheral device interface 803 may be implemented on a separate chip or circuit board. This is not limited in this embodiment.

The RF circuit 804 is configured to receive and transmit a RF signal, also referred to as an electromagnetic signal. The RF circuit 804 communicates with a communication network and other communication devices through the electromagnetic signal. The RF circuit 804 may convert an electric signal into an electromagnetic signal for transmission, or convert a received electromagnetic signal into an electric signal. In an example embodiment, the RF circuit 804 includes: an antenna system, an RF transceiver, one or more amplifiers, a tuner, an oscillator, a digital signal processor, a codec chip set, a subscriber identity module card, and the like. The RF circuit 804 may communicate with another terminal by using at least one wireless communications protocol. The wireless communications protocol includes, but not limited to, a metropolitan area network, different generations of mobile communication networks (2G, 3G, 4G, and 5G), a wireless local area network, and/or a wireless fidelity (Wi-Fi) network. In some embodiments, the RF circuit 804 may further include a circuit related to near field communication (NFC), which is not limited in the disclosure.

The display screen 805 is configured to display a user interface (UI). The UI may include a graphic, a text, an icon, a video, and any combination thereof. When the display screen 805 is a touchscreen, the display screen 805 is further capable of acquiring a touch signal on or above a surface of the display screen 805. The touch signal may be inputted into the processor 801 as a control signal for processing. In this case, the display screen 805 may be further configured to provide a virtual button and/or a virtual keyboard, also referred to as a soft button and/or a soft keyboard. In some embodiments, there may be one display screen 805, disposed on a front panel of the terminal 800. In some other embodiments, there may be at least one display screens 805, respectively disposed on different surfaces of the terminal 800 or designed in a foldable shape. In some embodiments, the display screen 805 may be a flexible display screen disposed on a curved surface or a folded surface of the terminal 800. The display screen 805 may be further set in a non-rectangular irregular pattern, that is, a special-shaped screen. The display screen 805 may be manufactured by using a material such as a liquid crystal display (LCD), an organic light-emitting diode (OLED), or the like.

The audio circuit 806 may include a microphone and a speaker. The microphone is configured to acquire sound waves of a user and an environment, and convert the sound waves into electrical signals and input the electrical signals into the processor 801 for processing, or input the electrical signals into the RF circuit 804 to implement voice communication. For stereo acquisition or noise reduction, there may be a plurality of microphones, disposed at different portions of the terminal 800 respectively. The microphone may be further an array microphone or an omnidirectional collection microphone. The speaker is configured to convert electric signals from the processor 801 or the RF circuit 804 into sound waves. The speaker may be a conventional thin-film speaker or a piezoelectric ceramic speaker. When the speaker is the piezoelectric ceramic speaker, electric signals not only may be converted into sound waves that may be heard by human, but also may be converted into sound waves that cannot be heard by human for ranging and the like. In some embodiments, the audio circuit 806 may also include an earphone jack.

The positioning component 807 is configured to position a current geographic location of the terminal 800, to implement a navigation or a location based service (LBS). The positioning component 807 may be a positioning component based on the Global Positioning System (GPS) of the United States, the BeiDou System of China, the GLONASS System of Russia, or the GALILEO System of the European Union.

The power source 808 is configured to supply power for components in the terminal 800. The power supply 808 may be an alternating-current power supply, a direct-current power supply, a disposable battery, or a rechargeable battery. When the power supply 808 includes the rechargeable battery, the rechargeable battery may be a wired rechargeable battery or a wireless rechargeable battery. The rechargeable battery may be further configured to support a fast charge technology.

A person skilled in the art would understand that the structure shown in FIG. 12 does not constitute a limitation on the terminal 800, and the terminal may include more components or fewer components than those shown in the figure, or some components may be combined, or a different component deployment may be used.

Figure 13:
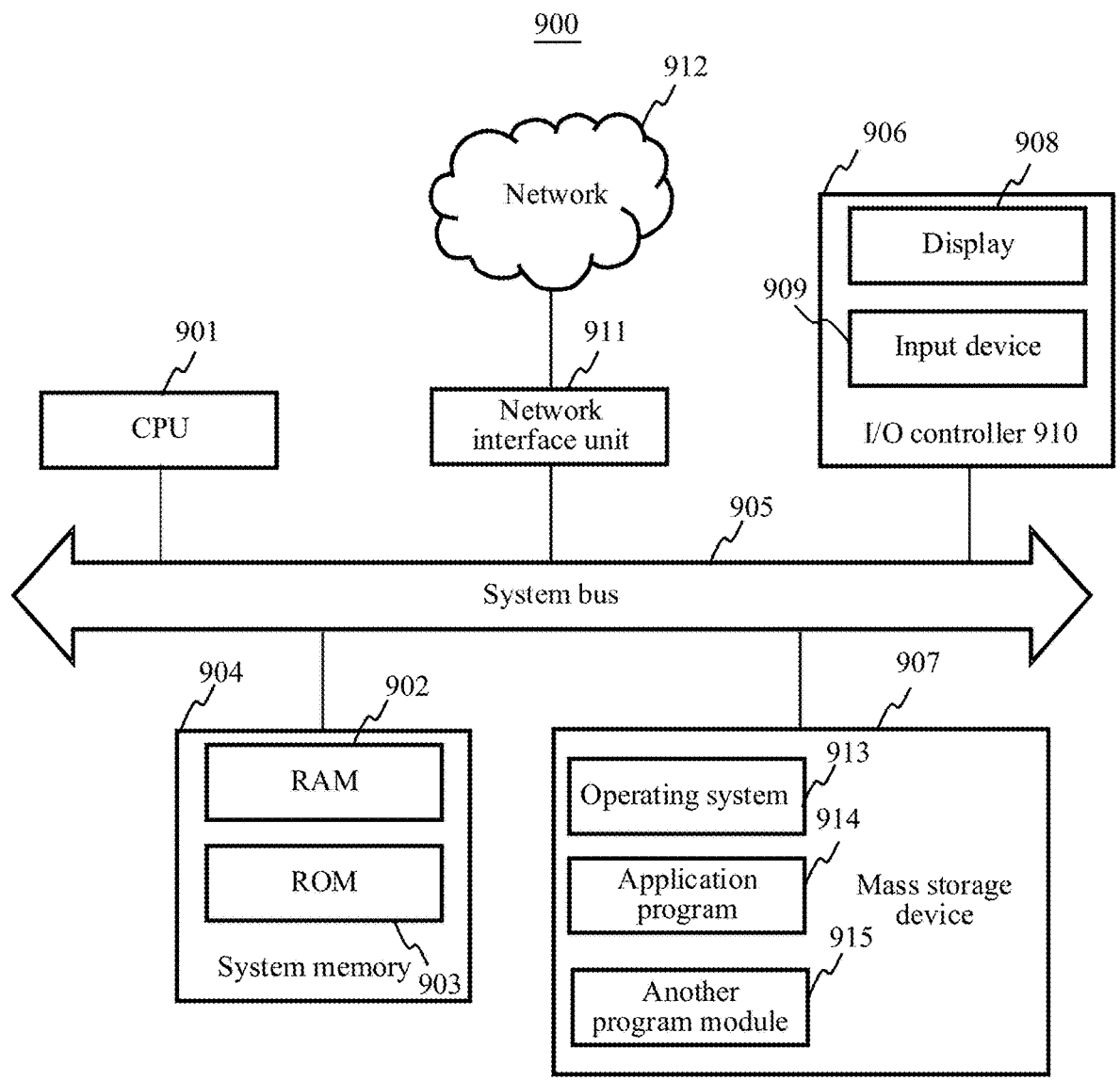
FIG. 13 is a schematic structural diagram of a server according to an example embodiment of the disclosure.

FIG. 13 is a schematic structural diagram of a server according to an embodiment of the disclosure. The server is configured to implement the artifact removal method based on ML and the method for training an artifact removal model based on ML provided in the example embodiments.

Referring to FIG. 13, the server 900 may include a CPU 901, a system memory 904 including a RAM 902 and a ROM 903, and a system bus 905 connecting the system memory 904 and the CPU 901. The server 900 further includes a basic I/O system 906 helping transmit information between components in a computer, and a mass storage device 907 configured to store an operating system 913, an application program 914 and another program module 915.

The basic I/O system 906 includes a display 908 configured to display information and an input device 909 such as a mouse or a keyboard for a user to input information. The monitor 908 and the input device 909 are both connected to the CPU 901 by using an I/O controller 910 connected to the system bus 905. The basic I/O system 906 may further include the I/O controller 910, to receive and process inputs from a plurality of other devices, such as the keyboard, the mouse, or an electronic stylus. Similarly, the I/O controller 910 further provides an output to a display screen, a printer or another type of an output device.

The mass storage device 907 is connected to the CPU 901 through a mass storage controller (not shown) connected to the system bus 905. The mass storage device 907 and an associated computer-readable medium provide non-volatile storage for the server 900. That is, the mass storage device 907 may include a computer-readable medium (not shown) such as a hard disk or a compact disc read-only memory (CD-ROM) drive.

Without loss of generality, the computer-readable medium may include a computer storage medium and a communications medium. The computer storage medium includes volatile and non-volatile media, and removable and non-removable media implemented by using any method or technology and configured to store information such as computer-readable instructions, a data structure, a program module, or other data. The computer storage medium includes a RAM, a ROM, an EPROM, an EEPROM, a flash memory or another solid-state memory technology, a CD-ROM, a digital versatile disc (DVD) or a solid-state drive (SSD), another optical memory, a magnetic cassette, a magnetic tape, a magnetic disk memory, or another magnetic storage device. The RAM may include a resistance random access memory (ReRAM) and a dynamic random access memory (DRAM). Certainly, a person skilled in the art may know that the computer storage medium is not limited to the foregoing several types. The system memory 904 and the mass storage device 907 may be collectively referred to as a memory.

According to the embodiments of the disclosure, the server 900 may further be connected, by using a network such as the Internet, to a remote computer on the network and run. That is, the server 900 may be connected to a network 912 by using a network interface unit 911 connected to the system bus 905, or may be connected to another type of network or a remote computer system (not shown) by using the network interface unit 911.

The disclosure further provides a computer device, including a processor and a memory, the memory storing at least one instruction, at least one program, a code set, or an instruction set, the at least one instruction, the at least one program, the code set, or the instruction set being loaded and executed by the processor to implement the artifact removal method based on ML and the method for training an artifact removal model based on ML provided in the example embodiments.

The disclosure further provides a computer-readable storage medium, storing at least one instruction, at least one program, a code set, or an instruction set, the at least one instruction, the at least one program, the code set, or the instruction set being loaded and executed by a processor to implement the artifact removal method based on ML and the method for training an artifact removal model based on ML provided in the example embodiments.

The disclosure further provides a computer program product, including computer instructions, the computer instructions being stored in a computer-readable storage medium. A processor of a computer device reads the computer instructions from the computer-readable storage medium, and the processor executes the computer instructions, so that the computer device performs the artifact removal method based on ML and the method for training an artifact removal model based on ML provided in the example embodiments of the disclosure.

The sequence numbers of the example embodiments of the disclosure are merely for description purposes, and are not intended to indicate priorities of the embodiments.

A person of ordinary skill in the art would understand that all or some of the operations of the example embodiments may be implemented by hardware, or may be implemented a program instructing related hardware. The program may be stored in a computer-readable storage medium. The storage medium may be a ROM, a magnetic disk, or an optical disc, or the like.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above embodiments may be implemented in algorithms that execute on one or more processors. Furthermore, the components, elements or units represented by a block or processing operations may employ any number of related art techniques for electronics configuration, signal processing and/or control, data processing and the like.

The technical solutions provided in the embodiments of an example embodiment of the disclosure achieve at least the following beneficial effects.

In this method, artifacts that may be generated in a process of compressing a video is preprocessed by using an artifact removal model using a residual learning structure, and more texture details of a video frame are accurately reserved in a process of performing feature extraction on the video frame through residual learning, so that a compressed and decompressed video frame has higher quality; and artifacts that may appear in a process of encoding and compressing a video are preprocessed by using the artifact removal model, thereby preventing a plurality of types of artifacts from noticeably appearing appear in the encoded and compressed video. Compared with a conventional artifact removal method in which a serial combination of different filters and a large quantity of tests are required to achieve an expected artifact removal effect, this method may save a lot of test costs and may resolve a problem of monolithic processing of the plurality of types of artifacts.

The foregoing descriptions are merely example embodiments of the disclosure, but are not intended to limit the disclosure. Any modification, equivalent replacement, or improvement made within the spirit and principle of the disclosure falls within the protection scope of the disclosure.

What is claimed is:

1. An artifact removal method based on machine learning, performed by an electronic device, the method comprising:

invoking an artifact removal model to perform feature extraction on an $i^{th}$ original image frame of a video, to obtain a feature vector of the $i^{th}$ original image frame, the video comprising at least two original image frames and i being a positive integer;

invoking the artifact removal model to perform dimension reduction on the feature vector, to obtain a feature vector after the dimension reduction;

invoking the artifact removal model to perform feature reconstruction on the feature vector after the dimension reduction, to predict a residual between the $i^{th}$ original image frame and an image frame obtained after the $i^{th}$ original image frame is compressed;

invoking the artifact removal model to add the predicted residual and the $i^{th}$ original image frame, to obtain a target image frame after artifact removal processing; and sequentially performing encoding and compression on at least two target image frames corresponding to the at least two original image frames, to obtain a video frame sequence after artifact removal, wherein the artifact removal model comprises a first 1×1 convolutional layer, a second 1×1 convolutional layer, a first feature extraction layer, and a feature fusion layer, and wherein the invoking the artifact removal model to perform the dimension reduction on the feature vector comprises:

invoking the first 1×1 convolutional layer to perform the dimension reduction on the feature vector, to obtain a first feature vector after the dimension reduction;

invoking the second 1×1 convolutional layer to perform the dimension reduction on the feature vector, to obtain a second feature vector after the dimension reduction;

invoking the first feature extraction layer to perform feature extraction on the second feature vector, to obtain a second feature vector after the feature extraction; and invoking the feature fusion layer to fuse the first feature vector with the second feature vector after the feature extraction, to obtain the feature vector after the dimension reduction.

2. The method according to claim 1, wherein the artifact removal model comprises at least two feature extraction units and another feature fusion layer, the at least two feature extraction units being connected in sequence, and an output end of each feature extraction unit being further connected to an input end of the another feature fusion layer; and the invoking the artifact removal model to perform the feature extraction comprises:

invoking each of the at least two feature extraction units to perform the feature extraction on the $i^{th}$ original image frame, to obtain at least two feature subvectors; and invoking the another feature fusion layer to fuse the at least two feature subvectors, to obtain the feature vector.

3. The method according to claim 1, wherein the artifact removal model is obtained through training in the following manner:

obtaining a training sample, each group of training samples comprising each original image frame sample of a video sample and an image frame sample obtained after the original image frame sample is encoded and compressed;

invoking the artifact removal model to predict a residual between the original image frame sample and the image frame sample after encoding and compression in each group of training samples, to obtain a sample residual;

invoking the artifact removal model to add the sample residual and the image frame sample after the encoding and compression, to obtain a target image frame sample after artifact removal processing; and determining a loss between the target image frame sample and the original image frame sample, and adjusting model parameters in the artifact removal model based on the loss, to train a residual learning capability of the artifact removal model.

4. The method according to claim 3, wherein the invoking the artifact removal model to predict the residual between the original image frame sample and the image frame sample comprises:

invoking the artifact removal model to perform feature extraction on the image frame sample after the encoding and compression, to obtain a sample feature vector of the image frame sample after the encoding and compression;

invoking the artifact removal model to perform dimension reduction on the sample feature vector, to obtain a sample feature vector after the dimension reduction; and invoking the artifact removal model to perform feature reconstruction on the sample feature vector after the dimension reduction, to obtain the sample residual.

5. The method according to claim 4, wherein the artifact removal model comprises at least two feature extraction units and another feature fusion layer, the at least two feature extraction units being connected in sequence, and an output end of each feature extraction unit being further connected to an input end of the another feature fusion layer; and the invoking the artifact removal model to perform the feature extraction on the image frame sample after the encoding and compression comprises:

invoking each of the at least two feature extraction units to perform feature extraction on the original image frame sample, to obtain at least two sample feature subvectors; and invoking the another feature fusion layer to fuse the at least two sample feature subvectors, to obtain the sample feature vector.

6. The method according to claim 4, wherein the invoking the artifact removal model to perform the dimension reduction on the sample feature vector comprises:

invoking the first 1×1 convolutional layer to perform the dimension reduction on the sample feature vector, to obtain a first sample feature vector after the dimension reduction;

invoking the second 1×1 convolutional layer to perform the dimension reduction on the sample feature vector, to obtain a second sample feature vector after the dimension reduction;

invoking the first feature extraction layer to perform feature extraction on the second sample feature vector, to obtain a second sample feature vector after the feature extraction; and invoking the feature fusion layer to fuse the first sample feature vector with the second sample feature vector after the feature extraction, to obtain the sample feature vector after the dimension reduction.

7. An electronic device, comprising:
a memory; and
a processor connected to the memory,
the processor being configured to load and execute executable instructions to implement the artifact removal method based on machine learning (ML) according to claim 1.

8. A non-transitory computer-readable storage medium, storing at least one instruction, at least one program, a code set, or an instruction set, executable at least one processor to perform the method according to claim 1.

9. An artifact removal apparatus based on machine learning (ML), the apparatus comprising:
at least one memory configured to store program code; and
at least one processor configured to read the program code and operate as instructed by the program code, the program code comprising:
first invoking code configured to cause the at least one processor to invoke an artifact removal model to perform feature extraction on an $i^{th}$ original image frame of a video, to obtain a feature vector of the $i^{th}$ original image frame, the video comprising at least two original image frames and i being a positive integer; invoke the artifact removal model to perform dimension reduction on the feature vector, to obtain a feature vector after the dimension reduction; and invoke the artifact removal model to perform feature reconstruction on the feature vector after the dimension reduction, to predict a residual between the $i^{th}$ original image frame and an image frame obtained after the $i^{th}$ original image frame is compressed,
the first invoking code configured to cause the at least one processor configured to invoke the artifact removal model to add the predicted residual and the $i^{th}$ original image frame, to obtain a target image frame after artifact removal processing; and
encoding code configured to cause the at least one processor to sequentially perform encoding and compression on at least two target image frames corresponding to the at least two original image frames, to obtain a video frame sequence after artifact removal,
wherein the artifact removal model comprises a first 1×1 convolutional layer, a second 1×1 convolutional layer, a first feature extraction layer, and a feature fusion layer; and
wherein the first invoking code configured to cause the at least one processor to: invoke the first 1×1 convolutional layer to perform the dimension reduction on the feature vector, to obtain a first feature vector after the dimension reduction; invoke the second 1×1 convolutional layer to perform the dimension reduction on the feature vector, to obtain a second feature vector after the dimension reduction; invoke the first feature extraction layer to perform feature extraction on the second feature vector, to obtain a second feature vector after the feature extraction; and invoke the feature fusion layer to fuse the first feature vector with the second feature vector after the feature extraction, to obtain the feature vector after the dimension reduction.

10. The apparatus according to claim 9, wherein the artifact removal model comprises at least two feature extraction units and another feature fusion layer, the at least two feature extraction units being connected in sequence, and an output end of each feature extraction unit being further connected to an input end of the another feature fusion layer; and
the first invoking code is configured to cause the at least one processor to: invoke each of the at least two feature extraction units to perform the feature extraction on the $i^{th}$ original image frame, to obtain at least two feature subvectors; and invoke the another feature fusion layer to fuse the at least two feature subvectors, to obtain the feature vector.

11. The apparatus according to claim 9, wherein the program code further comprises:
obtaining code configured to cause the at least one processor to obtain training samples, each group of training samples comprising each original image frame sample of a video sample and an image frame sample obtained after the original image frame sample is encoded and compressed;
second invoking code configured to cause the at least one processor to invoke the artifact removal model to predict a residual between the original image frame sample and the image frame sample after encoding and compression in each group of training samples, to obtain a sample residual,
the second invoking code configured to cause the at least one processor to invoke the artifact removal model to add the sample residual and the image frame sample after the encoding and compression, to obtain a target image frame sample after artifact removal processing; and
training code configured to cause the at least one processor to determine a loss between the target image frame sample and the original image frame sample, and adjust model parameters in the artifact removal model based on the loss, to train a residual learning capability of the artifact removal model.

12. The apparatus according to claim 11, wherein
the second invoking code is configured to cause the at least one processor to: invoke the artifact removal model to perform feature extraction on the image frame sample after the encoding and compression, to obtain a sample feature vector of the image frame sample after the encoding and compression; invoke the artifact removal model to perform dimension reduction on the sample feature vector, to obtain a sample feature vector after the dimension reduction; and invoke the artifact removal model to perform feature reconstruction on the sample feature vector after the dimension reduction, to obtain the sample residual.

13. The apparatus according to claim 12, wherein the artifact removal model comprises at least two feature extraction units and another feature fusion layer, the at least two feature extraction units being connected in sequence, and an output end of each feature extraction unit being further connected to an input end of the another feature fusion layer; and the second invoking code is configured to cause the at least one processor to: invoke each of the at least two feature extraction units to perform feature extraction on the original image frame sample, to obtain at least two sample feature subvectors; and invoke the another feature fusion layer to fuse the at least two sample feature subvectors, to obtain the sample feature vector.

14. The apparatus according to claim 12, wherein the second invoking code is configured to cause the at least one processor to: invoke the first 1×1 convolutional layer to perform the dimension reduction on the sample feature vector, to obtain a first sample feature vector after the dimension reduction; invoke the second 1×1 convolutional layer to perform the dimension reduction on the sample feature vector, to obtain a second sample feature vector after the dimension reduction; invoke the first feature extraction layer to perform feature extraction on the second sample feature vector, to obtain a second sample feature vector after the feature extraction; and invoke the feature fusion layer to fuse the first sample feature vector with the second sample feature vector after the feature extraction, to obtain the sample feature vector after the dimension reduction.

15. A non-transitory computer-readable storage medium, storing at least one instruction, at least one program, a code set, or an instruction set, that is executable by at least one processor to perform the method according to claim 9.

16. An apparatus for training an artifact removal model based on machine learning (ML), the apparatus comprising:

at least one memory configured to store program code; and at least one processor configured to read the program code and operate as instructed by the program code, the program code comprising:

obtaining code configured to cause the at least one processor to obtain a training sample, each group of training samples comprising an original image frame sample of a video sample and an image frame sample obtained after the original image frame sample is encoded and compressed;

invoking code configured to cause the at least one processor to invoke the artifact removal model to perform feature extraction on the image frame sample after encoding and compression in each group of training samples, to obtain a sample feature vector; perform dimension reduction on the sample feature vector, to obtain a sample feature vector after the dimension reduction; and perform feature reconstruction on the sample feature vector after the dimension reduction, to predict a residual between the original image frame sample and the image frame sample after encoding and compression in each group of training samples and obtain a sample residual, the invoking code being further configured to cause the at least one processor to invoke the artifact removal model to add the sample residual and the image frame sample after the encoding and compression, to obtain a target image frame sample after artifact removal processing; and training code configured to cause the at least one processor to determine a loss between the target image frame sample and the original image frame sample, and adjust model parameters in the artifact removal model based on the loss, to train a residual learning capability of the artifact removal model, wherein the artifact removal model comprises a first 1×1 convolutional layer, a second 1×1 convolutional layer, a first feature extraction layer, and a feature fusion layer, and wherein the invoking code is configured to cause the at least one processor to invoke the artifact removal model to perform the dimension reduction on the sample feature vector comprises:

invoking the first 1×1 convolutional layer to perform the dimension reduction on the sample feature vector, to obtain a first sample feature vector after the dimension reduction;

invoking the second 1×1 convolutional layer to perform the dimension reduction on the sample feature vector, to obtain a second sample feature vector after the dimension reduction;

invoking the first feature extraction layer to perform feature extraction on the second sample feature vector, to obtain a second sample feature vector after the feature extraction; and invoking the feature fusion layer to fuse the first sample feature vector with the second sample vector after the feature extraction, to obtain the sample feature vector after the dimension reduction.

* * * * *